(12) United States Patent
Song

(10) Patent No.: US 11,092,695 B2
(45) Date of Patent: Aug. 17, 2021

(54) GEO-FUSION BETWEEN IMAGING DEVICE AND MOBILE DEVICE

(71) Applicant: Faraday&Future Inc., Gardena, CA (US)

(72) Inventor: Xiufeng Song, San Jose, CA (US)

(73) Assignee: Faraday & Future Inc., Gardena, CA (US)

( * ) Notice: Subject to any disclaimer, the term of this patent is extended or adjusted under 35 U.S.C. 154(b) by 496 days.

(21) Appl. No.: 15/639,176

(22) Filed: Jun. 30, 2017

(65) Prior Publication Data

US 2018/0143327 A1    May 24, 2018

Related U.S. Application Data

(60) Provisional application No. 62/357,160, filed on Jun. 30, 2016.

(51) Int. Cl.
*G01S 19/48* (2010.01)
*G01S 19/03* (2010.01)
*G01S 19/39* (2010.01)

(52) U.S. Cl.
CPC .............. *G01S 19/48* (2013.01); *G01S 19/03* (2013.01); *G01S 19/396* (2019.08)

(58) Field of Classification Search
CPC .......... G01S 19/51; G01S 19/33; G01S 19/42; G01S 19/421; G01S 19/423; G01S 19/426; G01S 5/0284; G01S 5/0289
See application file for complete search history.

(56) References Cited

U.S. PATENT DOCUMENTS

| | | | | |
|---|---|---|---|---|
| 5,563,607 A | * | 10/1996 | Loomis | G01S 19/07 342/357.44 |
| 6,275,707 B1 | * | 8/2001 | Reed | G01S 5/0072 342/357.31 |
| 7,139,651 B2 | * | 11/2006 | Knowlton | E02F 9/2037 701/50 |

(Continued)

OTHER PUBLICATIONS

Supej et al. "Comparison of Global Navigation Satellite System Devices on Speed Tracking in Road (Tran)SPORT Applications." Sensors 2014, 14, 23490-23508; doi:10.3390/s141223490. Dec. 2014. (Year: 2014).*

*Primary Examiner* — Gregory C. Issing

(74) *Attorney, Agent, or Firm* — Veros Legal Solutions LLP

(57) ABSTRACT

A method for improved position estimation. The method includes: receiving first position information from a first GNSS receiver of a vehicle dashboard camera, receiving second position information from a second GNSS receiver of a mobile device carried by a user and proximate the first GNSS receiver, and, when it is determined that the vehicle dashboard camera and the mobile device share the same inertial reference frame and are within the first distance and that the accuracy of either the first position information or the second position information falls beneath the threshold and that the predicted course of either the vehicle dashboard camera and the mobile device is calculated to pass through the region of poor satellite reception, time synchronizing the second position information with the first position information, and combining the first position information with the second position information to determine third position information.

12 Claims, 10 Drawing Sheets

(56) References Cited

U.S. PATENT DOCUMENTS

| | | | | |
|---|---|---|---|---|
| 7,659,848 B2* | 2/2010 | Dooley | | G01S 5/0036 342/357.57 |
| 7,769,393 B2* | 8/2010 | Jendbro | | G01S 19/05 342/357.46 |
| 8,364,405 B2* | 1/2013 | Sprock | | G06T 17/00 702/5 |
| 8,907,843 B2* | 12/2014 | Dooley | | G01S 19/24 342/357.4 |
| 9,250,097 B2* | 2/2016 | Bennett | | G01C 21/3688 |
| 2007/0161380 A1* | 7/2007 | Fok | | G01S 5/0009 455/456.1 |
| 2009/0079622 A1* | 3/2009 | Seshadri | | G01C 21/00 342/357.42 |
| 2009/0115657 A1* | 5/2009 | Cheng | | G01S 19/05 342/357.42 |
| 2009/0187300 A1* | 7/2009 | Everitt | | G01C 21/3602 701/31.4 |
| 2011/0102637 A1* | 5/2011 | Lasseson | | H04N 5/351 348/239 |
| 2011/0169690 A1* | 7/2011 | Yule | | G01S 5/0036 342/357.25 |
| 2011/0199917 A1* | 8/2011 | Karaoguz | | G01S 5/0284 370/252 |
| 2012/0306690 A1* | 12/2012 | Yule | | G01S 19/09 342/357.25 |
| 2014/0375807 A1* | 12/2014 | Muetzel | | H04N 7/18 348/148 |
| 2015/0073697 A1* | 3/2015 | Barrett | | G01S 19/426 701/409 |

* cited by examiner

GEO-FUSION BETWEEN IMAGING DEVICE AND MOBILE DEVICE

CROSS-REFERENCE TO RELATED APPLICATIONS

This application claims the priority of U.S. Provisional Application No. 62/357,160, filed Jun. 30, 2016, the entirety of which is hereby incorporated by reference.

BACKGROUND

Location capabilities of media devices can sometimes suffer from inaccuracies due to different factors, including poor environmental conditions, limited line of site to navigation satellites, and hardware equipped with lower performance satellite receivers. The resulting location inaccuracy can impact the quality of geotags for objects or events captured by the media devices. For example, an imaging device that uses built-in GNSS capabilities to geotag captured imagery might utilize a lower-power/quality receiver, in order to save cost and/or battery power. Even when the imaging device uses a high-quality location system, the accuracy of determined locations may be poor due to environmental conditions. Consequently, ways of improving the accuracy of locations obtained with such devices are desirable.

SUMMARY

This disclosure describes various embodiments that relate to improving the accuracy of location services for electronic devices.

A method for improving position estimation is disclosed. The method includes receiving first position information from a first GNSS receiver. The first position information includes a first group of position estimates associated with a first group of time stamps. The method also includes receiving second position information from a second GNSS receiver proximate the first GNSS receiver. The second position information includes a second group of position estimates associated with a second group of time stamps. The method can also include time synchronizing the second position information with the first position information and based on the time synchronizing, combining the first position information with the second position information to determine third position information. The third position information can include a third group of position estimates associated with a third group of time stamps.

A method is disclosed and includes receiving first position information from a first GNSS receiver of an imaging device. Second position information is received from a second GNSS receiver of an auxiliary device proximate the imaging device. The method also includes combining the first position information with the second position information to determine a location of the imaging device. The location of the imaging device is then associated with imagery recorded by the imaging device. Finally, the location of the imaging device and associated imagery is stored to a computer readable storage medium.

A navigation system is disclosed. The navigation system includes a first electronic device having a first GNSS receiver and a computer readable storage medium. The navigation system also includes a second electronic device near the first electronic device. The second electronic device includes a second GNSS receiver. The navigation system also includes a processor configured to receive first and second position information from the first and second GNSS receivers respectively. The processor is also configured to combine the first and second position information together to determine an estimated position of the first electronic device, and then save the estimated position of the electronic device to the computer readable storage medium of the first electronic device.

BRIEF DESCRIPTION OF THE DRAWINGS

The disclosure will be readily understood by the following detailed description in conjunction with the accompanying drawings, wherein like reference numerals designate like structural elements, and in which.

Figure 1A:
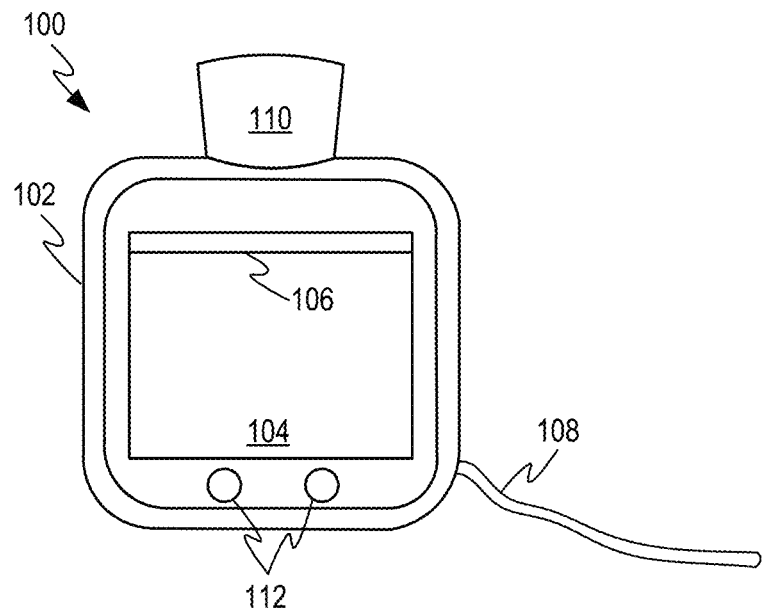
FIG. 1A shows a front surface of an electronic device.

Other aspects and advantages of the invention will become apparent from the following detailed description taken in conjunction with the accompanying drawings which illustrate, by way of example, the principles of the described embodiments.

DETAILED DESCRIPTION

This description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the invention is not limited to the embodiments shown, but is to be accorded the widest scope consistent with the principles and features disclosed herein.

A Satellite-based navigation system, often referred to as a Global Navigation Satellite System (GNSS), while capable of providing highly accurate position information, can suffer from a number of short-comings. One limitation of GNSS receivers is that because the signals emitted by the satellites making up a GNSS can be attenuated and may even be below a noise level, poor environmental conditions can adversely affect the performance of the GNSS receivers. Another limitation of GNSS receivers is that performance can be degraded when obstructions get between the GNSS receivers and satellites making up the GNSS.

According to various embodiments, a solution to such problems is to sample readings from multiple co-located GNSS receivers to determine the location of the GNSS receivers more precisely. In some embodiments, the location can be refined by determining an average position reported by the GNSS receivers. For example, an imaging device such as a vehicle dashboard camera can include its own GNSS receiver that is used to geotag pictures or video frames taken by the imaging device. When the imaging device is in electronic communication with a mobile device such as a cellular phone, the location data from the imaging device can be combined with location data provided by a GNSS receiver of the cellular phone. A processor in one of the devices, or a process located elsewhere, can then combine the location data from the two devices to obtain an averaged position.

In some embodiments, one of the GNSS receivers may be known to generally provide more accurate position information. For example, a cellular phone may have a more accurate GNSS receiver than an imaging device. In such a case, the processor can be configured to determine relative accuracy of the imaging device position information relative to the cellular phone position information. The determined relative accuracy can then be used to generate a weighting factor, which can be used to weigh the position information obtained from the cellular phone more heavily than the position information received from the imaging device. In some embodiments, the cellular phone can also be configured to determine its location in other ways, such as by cellular tower triangulation or by using Wi-Fi derived location information. This additional location data can be used in many ways. In some embodiments, only the data from the GNSS receiver of the cellular phone is combined with GNSS receiver data from the imaging device. After combining the GNSS receiver data, the resulting data can then be subsequently combined with the additional location data to arrive at an estimated position. In other embodiments, the accuracy improvement provided by the additional location data can be combined with the GNSS receiver data, prior to combination with the position data from the other GNSS receiver. It should be noted that when additional co-located devices include GNSS receivers or other location determining components, location data from three or more devices can be combined to further improve location accuracy.

Combining the location data can also include synchronizing the times at which the location measurements were taken by the devices. Because devices with GNSS receivers receive GNSS time from the GNSS Satellites, there is generally no need to perform a device clock synchronization step since each device clock is generally already synchronized with GNSS time. Even though the device clocks are already synchronized the devices may not record position data at the same rate and/or time. This can be problematic and particularly problematic when a user of the devices is travelling at high speeds. Consequently, data from at least one of the devices can be time synchronized to match the data from the other device(s) prior to combining location data across multiple devices.

These and other embodiments are discussed below with reference to FIGS. 1A-8C, however, those skilled in the art will readily appreciate that the detailed description given herein with respect to these figures is for explanatory purposes only and should not be construed as limiting.

Figure 1B:
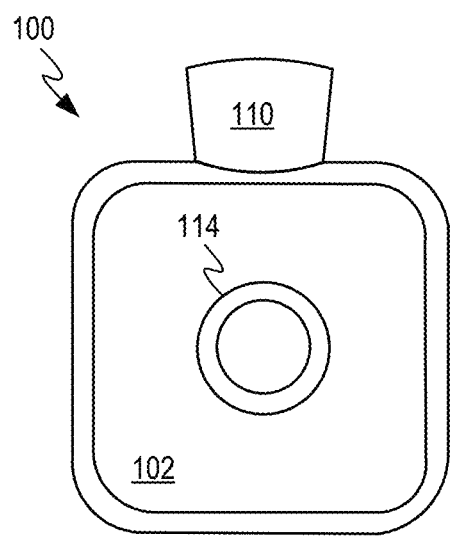
FIG. 1B shows a rear surface of the electronic device depicted in FIG. 1A.

FIG. 1A shows a front surface of an electronic device 100. Electronic device 100 can take the form of an imaging device configured to record images and/or video data. In some embodiments, the images and/or video can be stored to a memory device within electronic device 100 such as a removable memory card or other internal storage medium. In some embodiments, electronic device 100 can be configured to transmit the recorded images and/or video data to a remote storage location. In one particular embodiment, the imaging device can take the form of a dashboard camera ("dash cam") configured to record video through a front-facing window of a vehicle. Electronic device 100 can include device housing 102 and display 104 for showing what is being recorded or can be recorded by electronic device 100. Status bar 106 can be configured to display information such as current time, latitude/longitude, recording status and battery charge. Electronic device 100 can also include charging cord 108 for recharging a battery within electronic device 100 and providing energy to run electrical components disposed within device housing 102. FIG. 1A also shows mounting device 110 which can be used to mount electronic device 100 to a window or other surface of a vehicle. Also depicted in FIG. 1A are controls 112 for manipulating settings and operations of electronic device 100. FIG. 1B shows a rear surface of electronic device 100. In particular, camera module 114 protrudes from the depicted rear surface of electronic device 100 so that video footage shown in display 104 is oriented to substantially match the orientation of camera module 114. Electronic device 100 can include a GNSS receiver configured to detect satellite navigation satellites and a processor for associating the location information derived from the satellite data with imagery taken by camera module 114.

Figure 1C:
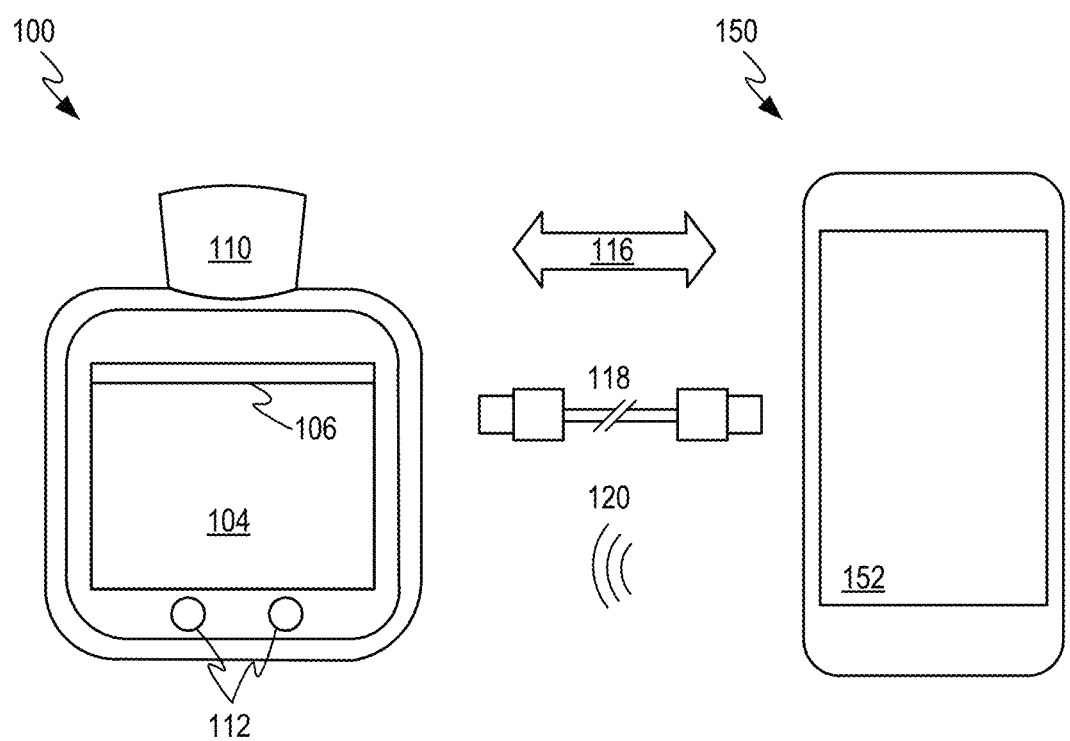
FIG. 1C shows both the electronic device and an auxiliary device.

FIG. 1C shows both electronic device 100 and auxiliary device 150. Auxiliary device 150 can take the form of a cellular device having its own GNSS receiver and various other components. Both electronic device 100 and auxiliary device 150 can include various antennas or ports capable of carrying out unidirectional or bidirectional communication 116 between the devices. For example, cable 118 can be used to engage ports in electronic device 100 and auxiliary device 150. Cable 118 can then be used to transfer data back and forth between the two devices at high speeds. Alternatively, antennas associated with each of the devices can be configured to exchange data using Bluetooth®, Near Field Communications, P2P Wi-Fi®, and/or other protocols. It should be noted that while an imaging device and a cellular phone are used here as exemplary devices, the described techniques could be used with any device. For example, instead of an imaging device taking the form of a dash cam, the imaging device could take the form of a wearable video-recording device that could be worn by a user.

Figure 2:
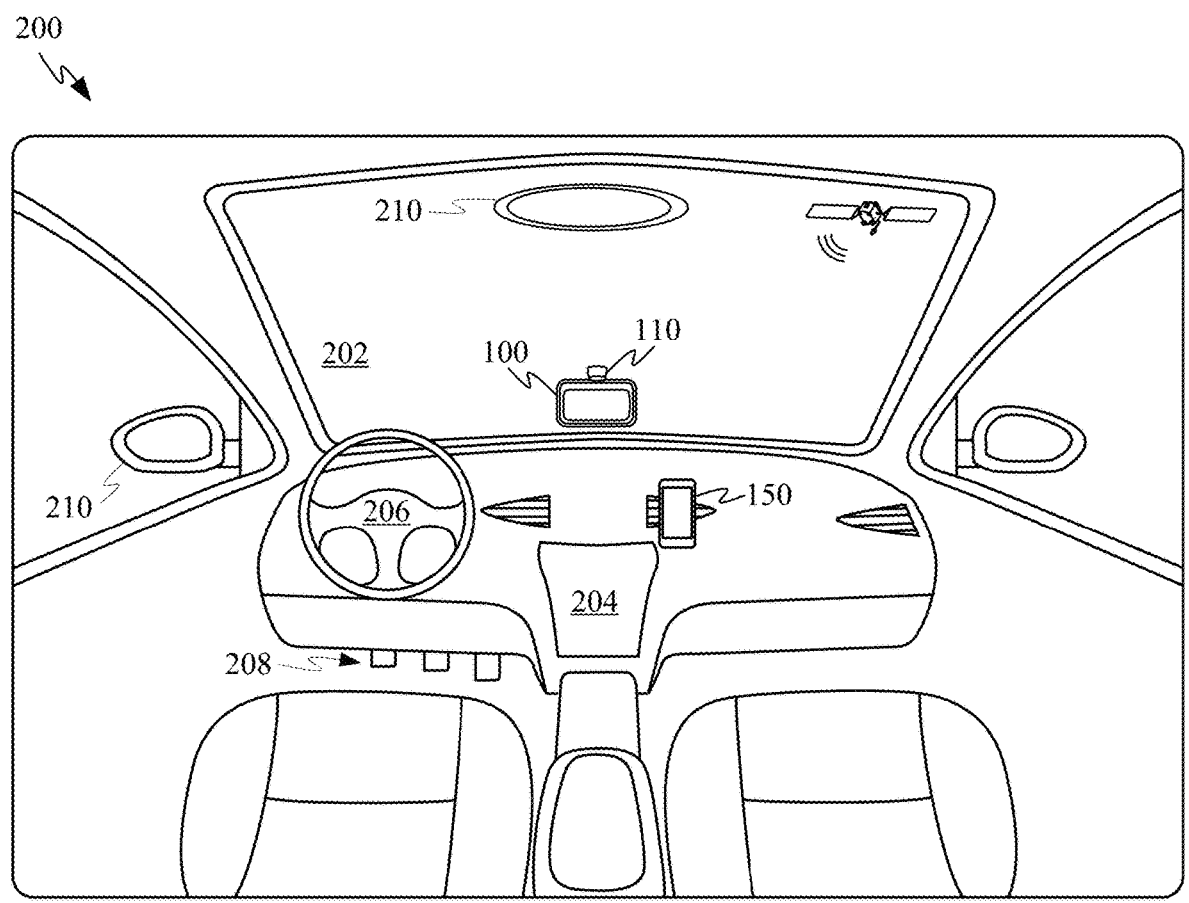
FIG. 2 shows an internal view of a vehicle.

FIG. 2 shows an internal view of vehicle 200. In particular, FIG. 2 shows electronic device 100 and auxiliary device 150 mounted within vehicle 200. Electronic device 100 can be mounted to windshield 202 of vehicle 200 using mounting device 110 and positioned to record images and video of the area directly in front of vehicle 200 through windshield 202. Auxiliary device 150 can also be mounted within vehicle 200, as depicted. Alternatively, auxiliary device 150 can be positioned within the coat pocket or purse of an occupant of vehicle 200, for example. According to various embodiments, two devices such as electronic device 100 and auxiliary device 150 can be considered to be in substantially the same location when positioned anywhere within or attached to vehicle 200. In some embodiments, vehicle 200 can include its own suite of electrical components. Such components may include display 204, internal electrical components such as one or more processors, and a GNSS receiver. In addition to the depicted internal components such as steering wheel 206, pedals 208, and mirrors 210, vehicle 200 can include externally mounted cameras in communication with the aforementioned internal circuitry of vehicle 200. In some embodiments, location data collected from a GNSS receiver of vehicle 200 can be combined with location data from electronic device 100 and/or auxiliary device 150.

Figure 3:
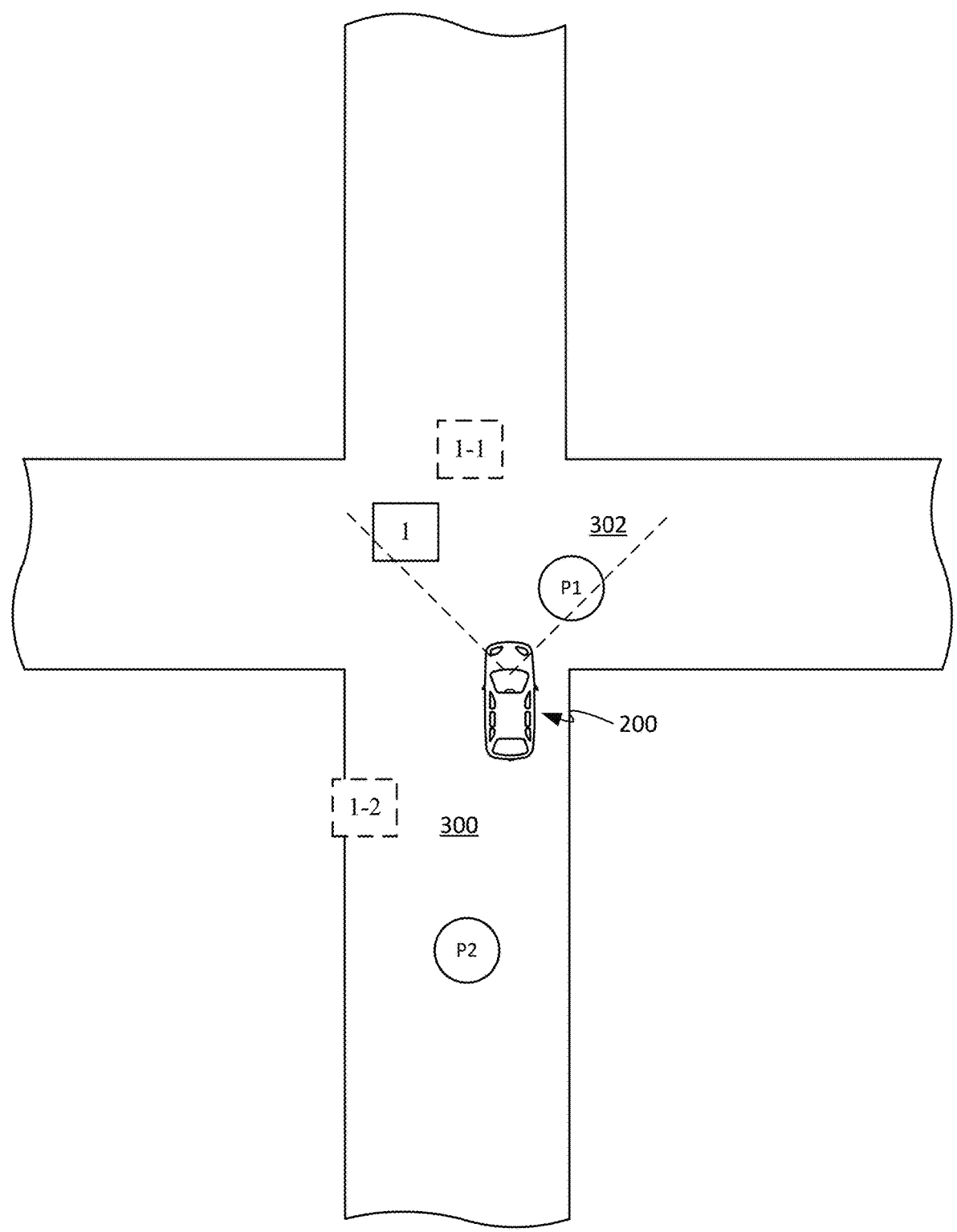
FIG. 3 shows a top view of the vehicle travelling along a road and entering an intersection.

FIG. 3 shows a top view of vehicle 200 travelling along a road 300 and entering an intersection. FIG. 3 also depicts a field of view 302 of camera module 114 of electronic device 100 or a camera associated with vehicle 200. At time $T_0$ event 1 occurs and takes place within field of view 302. A camera within vehicle 200 is positioned to take multiple video frames of event 1 as it occurs. P1 and P2 represent locations determined by electronic device 100 and auxiliary device 150, respectively. Use of either location P1 or P2 would result in misplacement of the location of event 1 at either location 1-1 or 1-2. By using both locations P1 and P2 a position of vehicle 200 can be determined with greater accuracy. Depending on how the location values are weighted, the increased amount of location data can be used to more accurately identify the location of event 1.

Event 1 can be any event observable by an imaging device positioned within vehicle 200. As depicted, event 1 occurs within field of view 302 of the camera positioned within vehicle 200 while vehicle 200 is crossing the intersection. Consequently, on account of the vehicle being in continuous motion, each frame of video taken by the camera can be taken from a different position/orientation. While the time signal provided by a GNSS constellation can accurately portray the timing of the event, a position of the imaging device during each frame of the video can also help in characterizing the location and details of event 1. For example, when the position of the car is known to a high enough level of precision, a position of the event within the frame of the display can be used to identify a location or at least a bearing of the event relative to the camera. The event position determination can be calculated by analyzing multiple frames of video taken by the camera. The respective position(s) of the vehicle associated with the times at which the frames were taken can be used to approximate the position of different participants or objects included in the event. While such a method would be particularly effective at determining the location of a stationary object within the field of view of the camera, approximate positions of moving objects could also be determined in this manner.

Deviations in the position of vehicle 200 can degrade the aforementioned location determination. For this reason, refining the position of vehicle 200 and/or the camera positioned within vehicle 200 can be very helpful. FIG. 3 also shows position P1 and position P2 of vehicle 200 as reported by two different position identification systems. As depicted, neither position P1 nor P2 is indicative of an accurate location of vehicle 200. In some embodiments, the camera can be configured to receive inputs from both position identification systems to refine a position of vehicle 200. For example, where both position information systems are determined to have a similar accuracy the camera can determine a location of vehicle 200 to be at a midpoint between P1 and P2; however, when the position identification system associated with position P1 is known to have a higher accuracy than the position identification system associated with P2, the determined location of vehicle 200 can be weighted so that an estimated position of vehicle 200 is determined to be much closer to P1 than to P2. As mentioned previously, various devices can perform the combining of location data. For example, the combining can be performed electronic device 100 (e.g., the imaging device in this case), auxiliary device 150 (e.g., a cell phone), or by another device (e.g., by a remote server).

Figure 4A:
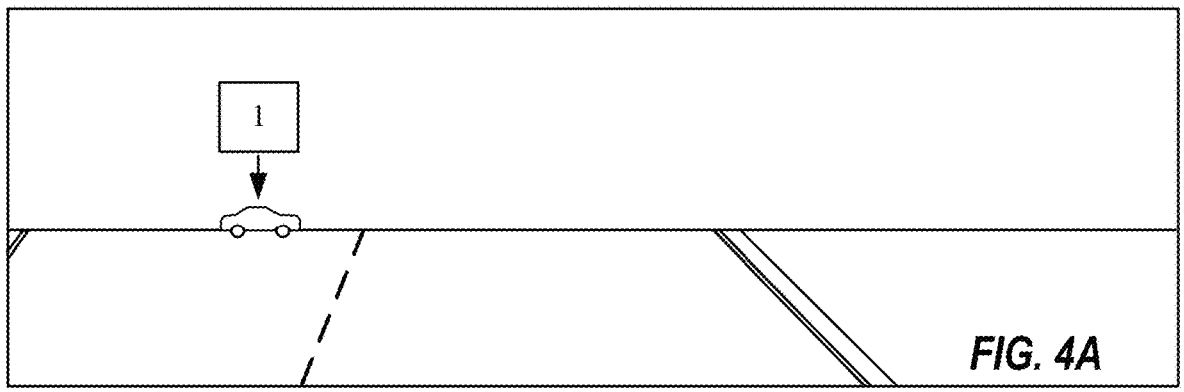
FIGS. 4A-4D show a series of video frames from a camera module of the electronic device that includes footage of an event.
Figure 4B:
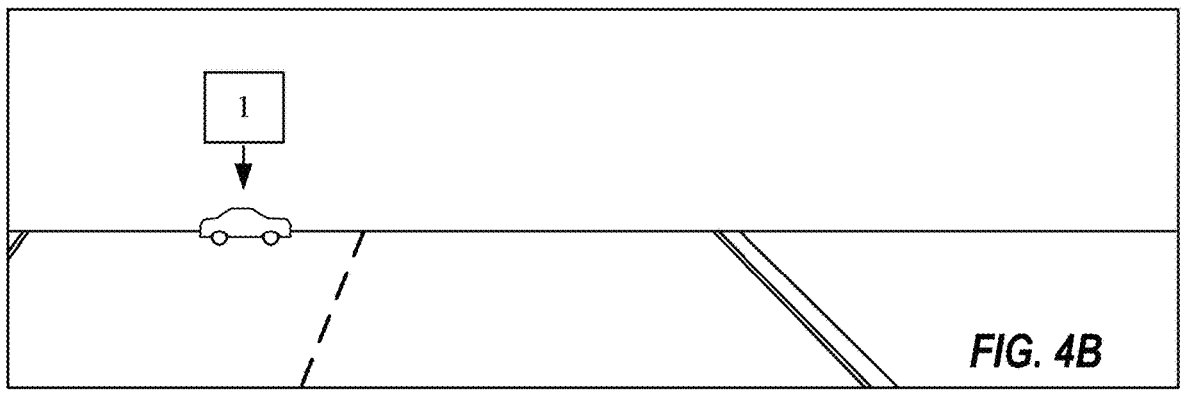
Figure 4C:
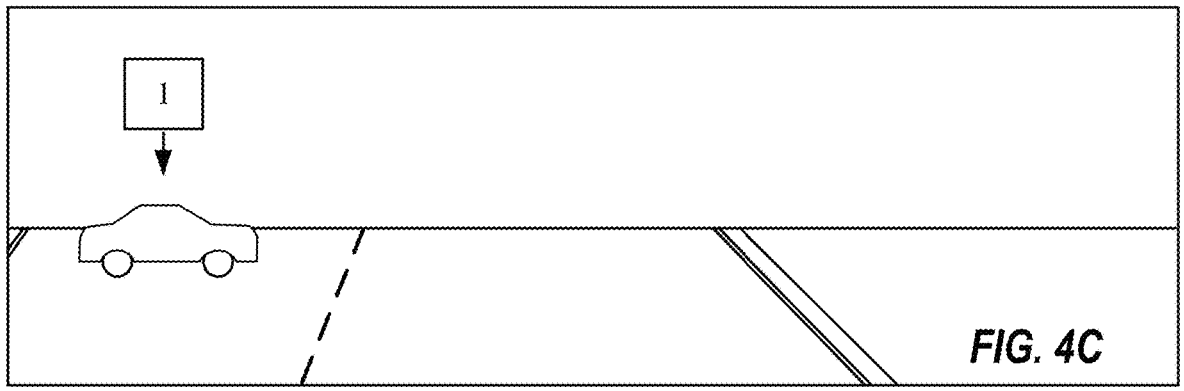
Figure 4D:
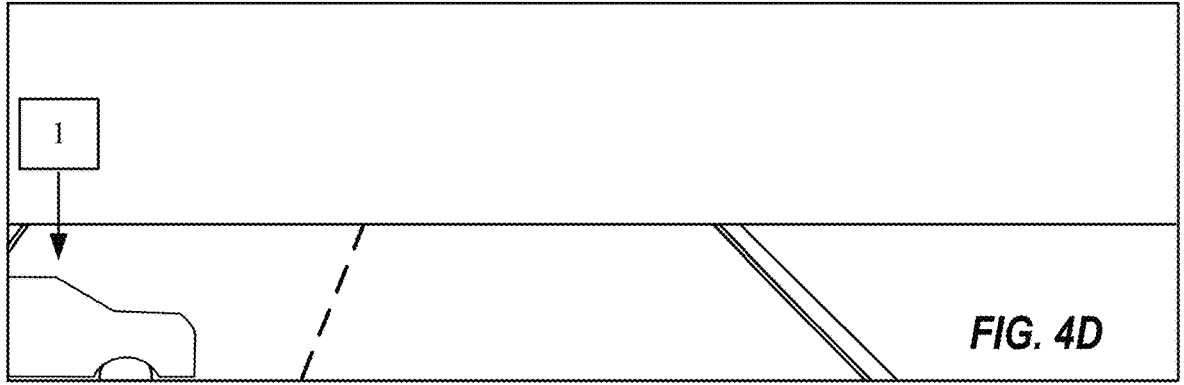

FIGS. 4A-4D show a series of exemplary video frames from a camera module 114 that captures portions of event 1. In particular, event 1 is illustrated as a vehicle positioned down the road that is not oriented consistently with the flow of traffic. FIG. 4A shows event 1 when it is first identified by camera module 114. FIGS. 4B-4D show how the vehicle representing event 1 tracks towards the left of the video frame over the series of video frames. In some embodiments, the position of event 1 can be determined at least in part by the position of the vehicle when event 1 passes out of the frame, as shown in FIG. 4D. When the field of view and orientation of camera module 114 is known, associated timing information in conjunction with the rate at which the car representing event 1 tracks across the screen can be used to determine an approximate position of event 1.

Pairing Initiation

Figure 5:
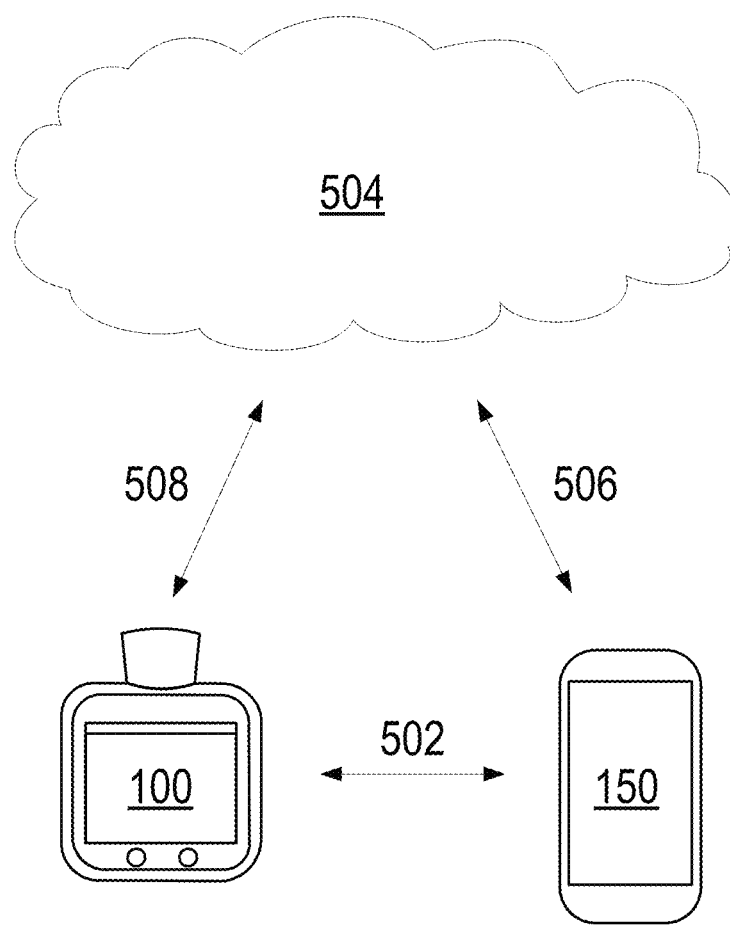
FIG. 5 is a diagram illustrating communication between various devices.

FIG. 5 is a diagram illustrating communication links that can be used for exchanging location information between various devices. In some embodiments, electronic device 100 may communicate with auxiliary device 150 directly as shown in FIG. 1C and as depicted by communication link 502 of FIG. 5. In some embodiments, electronic device 100 can communicate with auxiliary device 150 by way of cloud infrastructure 504 using communication links 506 and 508. In embodiments where cloud infrastructure 504 is utilized, fusion of the transmitted data can be carried out by processors associated with the cloud infrastructure.

The initial pairing or initialization of the depicted communication links can be accomplished in many ways, including any of the following: manual pairing, semi-autonomous pairing, or by autonomous pairing. In a manual pairing scenario, a user will generally manipulate both devices before a communications link is achieved. A semi-autonomous pairing can be carried out by logic that identifies devices likely to be useful in providing location data. The logic can then be configured to ask a user of the device to confirm whether to pair the two devices together. Finally autonomous pairing can be carried out by two devices that begin pairing with one another anytime a communications link can be established between the devices. This autonomous behavior can be pre-programmed at a factory or specifically setup by a user in software on one or both of the devices.

Criteria for initiating a pairing in the semi-autonomous or autonomous pairing modes can range from simple to complex. For example, a device could be configured to share data only when the devices share substantially the same inertial reference frame. For example, devices that moved at different speeds or in different directions can be discarded from consideration as potential location data sharing platforms. Furthermore, an initial pairing could also require the devices to be within a particular distance from one another. These criteria could help to limit pairing suggestions to devices located within the same vehicle.

Even after pairing two or more devices together in the aforementioned manner, the devices may only be configured to perform location data fusion when the accuracy or reliability of the location data for one or more of the devices falls beneath a particular threshold. For example, the accuracy of a GNSS receiver can be in the realm of 5-10 meters in good conditions and 50-100 meters in poor conditions. Consequently, the system can be set up so that when the accuracy of one or more of the paired devices falls below 20-30 meters, location data fusion is initiated. In some embodiments, location data fusion can be initiated when a predicted course of the device is calculated to pass through a region of poor satellite reception. Areas of poor satellite reception can be caused by numerous factors such as urban canyons, mountainous regions, and regions with high levels of electromagnetic radiation.

Figure 6:
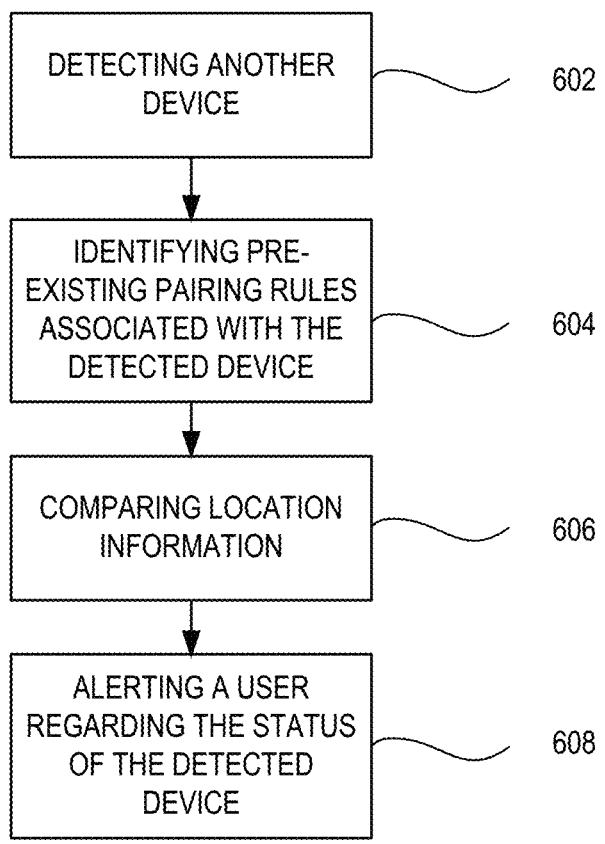
FIG. 6 shows a flow chart depicting a method for pairing a first device with a second device.

FIG. 6 shows a flow chart depicting a technique for pairing a first device with a second device. At 602, the first device is detected. The first device can be detected by the second device using, e.g., a wireless protocol such as Bluetooth® or Near Field Communications protocols. In some embodiments, the detection can be the result of a user requesting that a device perform a search for nearby compatible devices. At 604, the second device can identify the first device and determine whether the second device has any pre-existing pairing instructions for interfacing with the first device. For example, the second device can have instructions to pair with the first device any time the first device is detected. Alternatively, the second device could be configured to pair with the first device only when particular proximity criteria are met. At 606, the second device can be configured to check the inertial reference frame of the first device relative to that of the second device. In some embodiments, when the inertial reference frame of the first device differs too greatly from that of the second device, any pairing can be terminated. Conversely, when the inertial reference frames of the first and second devices are extremely close, the user can be provided additional prompting that the first device could be particularly effective as a secondary source of location data. In embodiments where location data fusion is carried out in the car, the cloud computing processor can also be used in identifying likely additional devices that could provide helpful location data. At 608, the second device can inform a user of the second device if a connection has been made with the first device, if a connection is recommended with the first device, or if a connection is even possible with the first device. In some embodiments, where the internal logic within the second device deems successful pairing unlikely or impossible, the user may receive no notification at all.

Synchronized Geo-Stream Fusion

Figure 7:
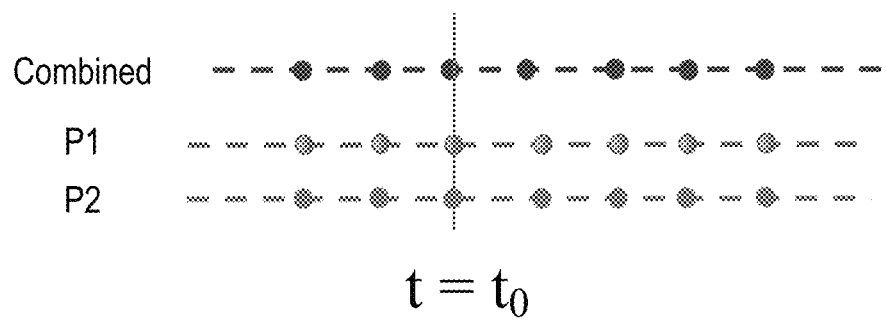
FIG. 7 shows two streams of position data, P1 and P2, that can be fused into a combined signal.

FIG. 7 shows how two streams of position data, P1 and P2, can be fused into a combined stream of position data ("Combined"), as depicted. This signal combination can be performed in various ways. One way to combine the data is to take an average position based on the readings of the two devices by weighting the two streams of position data equally in accordance with Eq(1), below:

$$\{t=t_0, \text{location}=(0.5(X_0+X_1), 0.5(Y_0+Y_1), 0.5(Z_0+Z_1))\} \qquad \text{Eq(1)}$$

In some embodiments, the streams of position data can be weighted differently in accordance with hardware specifications, internal device performance parameters and/or other factors. Weighting the location data sources allows known accuracy differences and operating parameters to be accounted for during the fusion, often yielding better performance. For example, the P1 data can be associated with a GNSS receiver with lower quality hardware incapable of providing precision below 10 m. Here, if the P2 data is capable of providing precision as high as 5 m, then the P2 data could be weighted more heavily than the P1 data. Similarly, one of the GNSS receivers may receive signals from more satellites than the other GNSS receiver. In such a situation, data from the GNSS receiver that is receiving signals from more satellites can be weighted more heavily than the data from the other GNSS receiver.

Figure 8A:
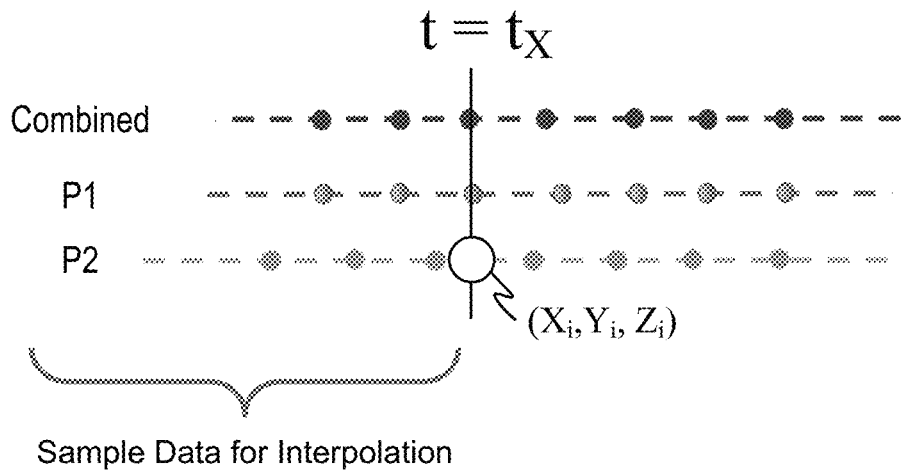
FIGS. 8A-8C show examples of unsynchronized location data fused into a combined signal.

It should be noted that the depicted data samples shown in FIG. 8A are substantially time-aligned. The discussion in the sections below relates to synchronizing and fusing location data that is not time-aligned.

Unsynchronized Geo-Stream Fusion

Figure 8B:
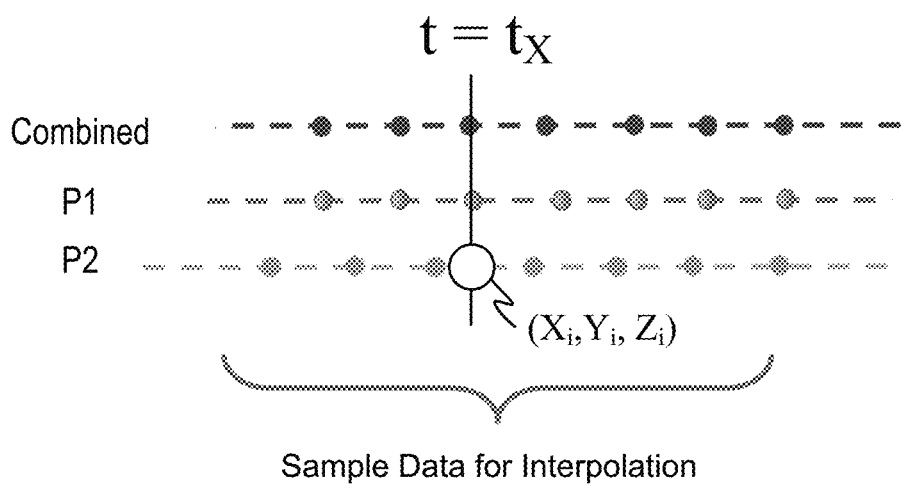

FIGS. 8A and 8B show unsynchronized streams of location data P1 and P2. The location data samples from P2 are clearly not time-aligned with the location data samples from P1. Before fusing the location data, at least one of the streams of location data can be processed to generate a stream of interpolated location data samples that are time-aligned with the data samples of the other stream, so that data fusion can be performed. For example, referring to FIG. 8A, stream P1 has a data sample at $t=t_x$. However, stream P2 does not have a data sample at $t=t_x$. This is because stream P2 is not time-aligned with stream P1. Instead, at $t=t_x$, stream P2 is "in between" data samples. According to various embodiments, an interpolation technique can be employed to generate an interpolated data sample $(X_i, Y_i, Z_i)$ at $t=t_x$ for P2, based on data samples that are available in stream P2.

$$\{t=t_x, \text{location}=(0.5(X_x+X_i), 0.5(Y_x+Y_i), 0.5(Z_x+Z_i))\} \qquad \text{Eq(2)}$$

In Eq(2), the fused location result is calculated based a weighted combination of location data samples from stream P1 and interpolated location data samples based on stream P2. Position $(X_x, Y_x, Z_x)$ represents a location data sample from stream P1. Position $(X_i, Y_i, Z_i)$ represents the interpolated location data sample at $t=t_x$, interpolated from available, but not time-aligned (i.e., not at $t=t_x$), location data samples from stream P2. Generally speaking, the more data samples used in the interpolation, the better the interpolation result. Various forms of linear and non-linear interpretation techniques can be applied, as would be understood by one of ordinary skill in the art. These techniques may include linear interpolation, polynomial interpolation, spline interpolation, and/or others. Similarly to the synchronized fusion case described above, the location data sample $(X_x, Y_x, Z_x)$ from stream P1 and the interpolated location data sample $(X_i, Y_i, Z_i)$ based on stream P2 can be weighted equally or differently.

FIG. 8A shows an exemplary real-time fusion of unsynchronized streams of location data. Real-time fusion techniques are used when fused results must be generated while the two (or more) streams of location data P1 and P2 are being received. In other words, the fused location result for $t=t_x$ is computed at or near time $t=t_x$. Note that at time $t=t_x$, the only available sample points from streams P1 and P2 are those shown in FIG. 8A as being at or to the "left" of $t=t_x$ (i.e., present and past data samples). Sample points from streams P1 and P2 that are shown in FIG. 8A as being to the "right" of $t=t_x$ (i.e., future data samples), have not yet been received. Thus, for real-time fusion, the interpolated data sample $(X_i, Y_i, Z_i)$ can only be based on the interpolation of data points from stream P2 that are at or to the "left" of $t=t_x$. This has a practical impact on the interpolation operation. As discussed previously, generally speaking, the more data samples used in the interpolation, the better the interpolation result. Real-time fusion thus reduces the number of data samples that can be used in the interpolation operation for generating the interpolated data sample $(X_i, Y_i, Z_i)$. Accordingly, the accuracy of the fused location estimates is expected to be less in the case of real-time fusion of unsynchronized streams, when compared to that of post-processed fusion of unsynchronized streams, which is discussed below.

FIG. 8B shows an exemplary post-process fusion of unsynchronized streams of location data. Post-process techniques can be used when fused results can be generated after the two (or more) streams of location data P1 and P2 have been received. Thus, the fused location result for $t=t_x$ is computed, not at or near time $t=t_x$, but at a later time when all the sample points from streams P1 and P2 shown in FIG. 8A have been received, including data samples at or to the "left" of $t=t_x$ and data samples to the "right" of $t=t_x$. Thus, for post-process fusion, the interpolated data sample $(X_i, Y_i, Z_i)$ can be based on the interpolation of all the data points from stream P2, not just those that are at or to the "left" of $t=t_x$. Post-process fusion thus increases the number of data samples that can be used in the interpolation. Compared to real-time fusion, post-process fusion can be expected to generate relatively more accurate fused location estimates.

Figure 8C:
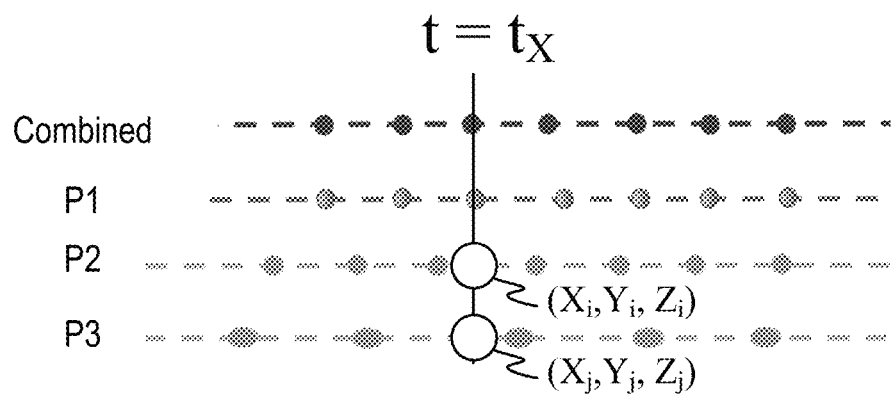

FIG. 8C shows three unsynchronized streams of location data. In particular, FIG. 8C shows how more than two streams of data can be combined together. Furthermore, FIG. 8C also shows that streams having different sampling rates can be combined. Even though the sampling rate of stream P3 is slower than the sampling rates of streams P1 and P2, the aforementioned interpolation techniques can still be used to calculate sample $(X_j, Y_j, Z_j)$. Eq(3) below, which shows how any number of samples can be fused together, can then be used to combine all three streams of data at time $t_x$.

$$\left\{ t=t_x, \text{location} = \left( \frac{X_a + X_b + \ldots X_n}{n}, \frac{Y_a + Y_b + \ldots Y_n}{n}, \frac{Z_a + Z_b + \ldots Z_n}{n} \right) \right\} \quad \text{Eq (3)}$$

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling operations of a navigation system or as computer readable code on a computer readable medium for controlling the operation of an automobile in accordance with a navigation route. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for improved position estimation, comprising:
   receiving first position information from a first GNSS receiver of a vehicle dashboard camera, wherein the first position information comprises a first plurality of position estimates associated with a first plurality of time stamps;
   receiving second position information from a second GNSS receiver of a mobile device carried by a user and proximate the first GNSS receiver, wherein the second position information comprises a second plurality of position estimates associated with a second plurality of time stamps;
   determining that the vehicle dashboard camera and the mobile device share a same inertial reference frame;
   determining that the vehicle dashboard camera and the mobile device are within a first distance;
   determining that an accuracy of either the first position information or the second position information falls beneath a threshold;
   determining that a predicted course of either the vehicle dashboard camera or the mobile device is calculated to pass through a region of poor satellite reception; and
   when it is determined that the vehicle dashboard camera and the mobile device share the same inertial reference frame and are within the first distance and that the accuracy of either the first position information or the second position information falls beneath the threshold and that the predicted course of either the vehicle dashboard camera and the mobile device is calculated to pass through the region of poor satellite reception, time synchronizing the second position information with the first position information,
   based on the time synchronizing, combining the first position information with the second position information to determine third position information, the third position information comprising a third plurality of position estimates associated with a third plurality of time stamps, and
   calculating a position of the event based on the third position information.

2. The method of claim 1, wherein the third plurality of time stamps are time-aligned with the first plurality of time stamps but not time-aligned with the second plurality of time stamps.

3. The method of claim 2, wherein time synchronizing the second position information with the first position information comprises interpolating the second plurality of position estimates to generate a plurality of interpolated position estimates time-aligned with the first plurality of time stamps, wherein combining the first position information with the second position information comprises combining the first plurality of position estimates with the plurality of interpolated position estimates.

4. The method of claim 1, wherein combining the first position information with the second position information comprises weighting the first position information more than the second position information.

5. The method of claim 4, wherein the first GNSS receiver has a higher accuracy than the second GNSS receiver.

6. The method of claim 1, wherein the combining is performed using the first position estimates and the second position estimates sampled from a time prior to a particular time.

7. The method of claim 1, wherein the time synchronizing includes performing an interpolation operation that utilizes the first position estimates and the second position estimates sampled both before and after a particular time.

8. A navigation system of a vehicle, comprising:
vehicle dashboard camera comprising a first GNSS receiver and a computer readable storage medium, the vehicle dashboard camera configured to capture an event;
a mobile device carried by a user proximate the vehicle dashboard camera and comprising a second GNSS receiver; and
a processor configured to:
receive first and second position information from the first and second GNSS receivers respectively,
determine if the vehicle dashboard camera and the mobile device share a same inertial reference frame;
determine if the vehicle dashboard camera and the mobile device are within a first distance;
determine if an accuracy of either the first position information or the second position information falls beneath a threshold;
determine if a predicted course of either the vehicle dashboard camera or the mobile device is calculated to pass through a region of poor satellite reception; and
when it is determined that the vehicle dashboard camera and the mobile device share the same inertial reference frame and are within the first distance and that the accuracy of either the first position information or the second position information falls beneath the threshold and that the predicted course of either the vehicle dashboard camera and the mobile device is calculated to pass through the region of poor satellite reception, combine the first and second position information together to determine an estimated position of the vehicle;
wherein the first position information comprising a first plurality of position estimates associated with a first plurality of time stamps; and
wherein the second position information comprising a second plurality of position estimates associated with a second plurality of time stamps.

9. The navigation system of claim 8, wherein the processor is positioned within the vehicle dashboard camera.

10. The navigation system of claim 8, wherein the processor is further configured to receive position information accuracy from the vehicle dashboard camera and the mobile device.

11. The navigation system of claim 10, wherein the processor is further configured to weight the first position information differently than the second position information in accordance with the received position information accuracy.

12. The navigation system of claim 8, wherein the processor is further configured to time synchronize the first and second position information prior to combining the first and second position information.

* * * * *